US008480466B2

(12) United States Patent
Muir et al.

(10) Patent No.: US 8,480,466 B2
(45) Date of Patent: Jul. 9, 2013

(54) METHOD AND APPARATUS FOR PREVIEWING A GAME

(75) Inventors: David Hugh Muir, Newcastle (AU); Binh T. Nguyen, Reno, NV (US); Craig A. Paulsen, Reno, NV (US)

(73) Assignee: IGT, Reno, NV (US)

( * ) Notice: Subject to any disclaimer, the term of this patent is extended or adjusted under 35 U.S.C. 154(b) by 1446 days.

(21) Appl. No.: 10/910,407

(22) Filed: Aug. 2, 2004

(65) Prior Publication Data

US 2005/0003883 A1 Jan. 6, 2005

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .......... 463/16

(58) Field of Classification Search
USPC .......... 463/35–37, 39, 42–43, 1, 12–13, 463/16–21, 23, 25, 29–30; 273/138.1, 143 R, 273/292, 293, 121 B
See application file for complete search history.

(56) References Cited

U.S. PATENT DOCUMENTS

| | | | |
|---|---|---|---|
| 3,662,105 | A | 5/1972 | Hurst et al. |
| 3,796,433 | A | 3/1974 | Fraley et al. |
| 4,071,689 | A | 1/1978 | Talmage et al. |
| 4,084,194 | A | 4/1978 | Hector |
| 4,099,722 | A | 7/1978 | Rodesch et al. |
| 4,247,845 | A | 1/1981 | Schmidt et al. |
| 4,335,809 | A | 6/1982 | Wain |
| 4,342,454 | A | 8/1982 | Baer et al. |
| 4,356,391 | A | 10/1982 | Takeda |
| 4,363,486 | A | 12/1982 | Chaudhry et al. |
| 4,422,775 | A | 12/1983 | Thoenig |
| 4,440,457 | A | 4/1984 | Fogelman et al. |
| 4,454,670 | A | 6/1984 | Bachmann et al. |

(Continued)

FOREIGN PATENT DOCUMENTS

| | | |
|---|---|---|
| AU | 704691 | 4/1997 |
| AU | 200022489 | 9/2000 |

(Continued)

OTHER PUBLICATIONS

Download-Games.com webpage, USPTO Archives (Wayback), webpage dated Feb. 5, 2003 (2 pages).*

(Continued)

*Primary Examiner* — Paul A D'Agostino
(74) *Attorney, Agent, or Firm* — Foley & Lardner LLP

(57) ABSTRACT

A portable sample play device, such as a player tracking card or other player-carried device, allows players or users of a gaming machine to view, and/or participate in, sample or preview play of a game. The portable sample play device can be a smart card that stores all necessary information itself, or a known magnetic stripe card that simply stores rudimentary information. Additionally, such a sample or preview can include many different modes of play. For instance, the gaming machine can display a preview of link progressive play, along with the progressive jackpot. It can also display the special bonus modes of various games, demonstrating to the player various special prizes than can be won. Such preview play can be interactive, allowing player participation, or passive, simply illustrating sample play without allowing user interaction. Preview play can also include full, nominal, zero, or other payouts if so desired.

47 Claims, 7 Drawing Sheets

U.S. PATENT DOCUMENTS

| | | | | | |
|---|---|---|---|---|---|
| 4,527,798 | A | | 7/1985 | Siekierski et al. | |
| 4,551,717 | A | | 11/1985 | Dreher | |
| 4,554,419 | A | | 11/1985 | King et al. | |
| 4,567,481 | A | | 1/1986 | Meier et al. | |
| 4,593,376 | A | | 6/1986 | Volk | |
| 4,662,637 | A | | 5/1987 | Pfeiffer | |
| 4,689,742 | A | | 8/1987 | Troy et al. | |
| 4,695,053 | A | | 9/1987 | Vazquez, Jr. et al. | |
| 4,718,672 | A | | 1/1988 | Okada | |
| 4,745,543 | A | | 5/1988 | Michener et al. | |
| 4,760,527 | A | | 7/1988 | Sidley | |
| 4,764,666 | A | | 8/1988 | Bergeron | |
| 4,792,783 | A | | 12/1988 | Burgess et al. | |
| 4,837,728 | A | | 6/1989 | Barrie et al. | |
| 5,024,439 | A | | 6/1991 | Okada | |
| 5,043,889 | A | | 8/1991 | Lucey | |
| 5,073,700 | A | | 12/1991 | D'Onofrio | |
| 5,110,129 | A | | 5/1992 | Alvarez | |
| 5,113,990 | A | | 5/1992 | Gabrius et al. | |
| 5,116,055 | A | | 5/1992 | Tracy | |
| 5,127,651 | A | | 7/1992 | Okada | |
| 5,212,369 | A | | 5/1993 | Karlisch et al. | |
| 5,243,697 | A | | 9/1993 | Hoeber et al. | |
| 5,265,874 | A | | 11/1993 | Dickinson et al. | |
| 5,277,424 | A | | 1/1994 | Wilms | |
| 5,280,809 | A | | 1/1994 | Tive | |
| 5,286,023 | A | | 2/1994 | Wood | |
| 5,321,241 | A | | 6/1994 | Craine | |
| 5,342,047 | A | | 8/1994 | Heidel et al. | |
| 5,370,399 | A | | 12/1994 | Liverance | |
| 5,395,242 | A | | 3/1995 | Slye et al. | |
| 5,410,344 | A | | 4/1995 | Graves et al. | |
| 5,429,361 | A | | 7/1995 | Raven et al. | |
| 5,452,379 | A | | 9/1995 | Poor | |
| 5,470,079 | A | | 11/1995 | LeStrange et al. | |
| 5,475,740 | A | | 12/1995 | Biggs, Jr. et al. | |
| 5,477,952 | A | | 12/1995 | Castellano et al. | |
| 5,488,411 | A | | 1/1996 | Lewis | |
| 5,494,287 | A | | 2/1996 | Manz | |
| 5,509,655 | A | | 4/1996 | Ugawa | |
| 5,510,809 | A | | 4/1996 | Sakai et al. | |
| 5,536,016 | A | | 7/1996 | Thompson | |
| 5,537,290 | A | | 7/1996 | Brown et al. | |
| 5,537,314 | A | | 7/1996 | Kanter | |
| 5,572,239 | A | | 11/1996 | Jaeger | |
| 5,577,731 | A | | 11/1996 | Jones | |
| 5,586,936 | A | | 12/1996 | Bennett et al. | |
| 5,603,659 | A | | 2/1997 | Okada | |
| 5,605,334 | A | | 2/1997 | McCrea, Jr. | |
| 5,611,730 | A | | 3/1997 | Weiss | |
| 5,630,081 | A | | 5/1997 | Rybicki et al. | |
| 5,638,426 | A | | 6/1997 | Lewis | |
| 5,640,193 | A | * | 6/1997 | Wellner | 725/100 |
| 5,654,746 | A | * | 8/1997 | McMullan et al. | 725/29 |
| 5,655,961 | A | | 8/1997 | Acres et al. | |
| 5,657,221 | A | | 8/1997 | Warman et al. | |
| 5,679,007 | A | | 10/1997 | Potdevin et al. | |
| 5,679,077 | A | | 10/1997 | Pocock et al. | |
| 5,687,331 | A | | 11/1997 | Volk et al. | |
| 5,694,562 | A | | 12/1997 | Fisher | |
| 5,702,304 | A | | 12/1997 | Acres et al. | |
| 5,704,835 | A | | 1/1998 | Dietz, II | |
| 5,707,286 | A | | 1/1998 | Carlson | |
| 5,711,708 | A | * | 1/1998 | Fischer | 463/36 |
| 5,712,661 | A | | 1/1998 | Jaeger | |
| 5,720,662 | A | | 2/1998 | Holmes, Jr. et al. | |
| 5,739,809 | A | | 4/1998 | McLaughlin et al. | |
| 5,759,102 | A | | 6/1998 | Pease et al. | |
| 5,761,647 | A | | 6/1998 | Boushy | |
| 5,765,797 | A | | 6/1998 | Greene et al. | |
| 5,766,076 | A | | 6/1998 | Pease et al. | |
| 5,769,716 | A | | 6/1998 | Saffari et al. | |
| 5,770,533 | A | | 6/1998 | Franchi | |
| 5,774,115 | A | | 6/1998 | Jaeger et al. | |
| 5,779,545 | A | | 7/1998 | Berg et al. | |
| 5,779,548 | A | | 7/1998 | Asai et al. | |
| 5,786,811 | A | | 7/1998 | Jaeger | |
| 5,788,573 | A | | 8/1998 | Baerlocher et al. | |
| 5,796,389 | A | | 8/1998 | Bertram et al. | |
| 5,800,268 | A | | 9/1998 | Molnick | |
| 5,803,809 | A | | 9/1998 | Yoseloff | |
| 5,805,145 | A | | 9/1998 | Jaeger | |
| 5,805,146 | A | | 9/1998 | Jaeger et al. | |
| 5,809,482 | A | | 9/1998 | Strisower | |
| 5,811,772 | A | | 9/1998 | Lucero | |
| 5,816,918 | A | | 10/1998 | Kelly et al. | |
| 5,818,361 | A | | 10/1998 | Acevedo | |
| 5,820,459 | A | | 10/1998 | Acres et al. | |
| 5,823,873 | A | | 10/1998 | Moody | |
| 5,826,882 | A | | 10/1998 | Ward | |
| 5,830,067 | A | | 11/1998 | Graves et al. | |
| 5,833,536 | A | | 11/1998 | Davids et al. | |
| 5,833,540 | A | | 11/1998 | Miodunski et al. | |
| 5,834,889 | A | | 11/1998 | Ge | |
| 5,841,428 | A | | 11/1998 | Jaeger et al. | |
| 5,851,148 | A | | 12/1998 | Brune et al. | |
| 5,851,149 | A | | 12/1998 | Xidos et al. | |
| 5,855,515 | A | * | 1/1999 | Pease et al. | 463/27 |
| 5,867,149 | A | | 2/1999 | Jaeger | |
| D406,612 | S | | 3/1999 | Johnson | |
| 5,876,285 | A | | 3/1999 | Salour et al. | |
| 5,882,261 | A | | 3/1999 | Adams | |
| 5,885,158 | A | | 3/1999 | Torango et al. | |
| 5,902,983 | A | | 5/1999 | Crevelt et al. | |
| 5,914,676 | A | | 6/1999 | Akpa | |
| 5,919,091 | A | | 7/1999 | Bell et al. | |
| 5,923,734 | A | * | 7/1999 | Taskett | 379/114.18 |
| 5,936,613 | A | | 8/1999 | Jaeger et al. | |
| 5,951,011 | A | | 9/1999 | Potter et al. | |
| 5,951,397 | A | | 9/1999 | Dickinson | |
| 5,956,876 | A | | 9/1999 | Burdette et al. | |
| 5,957,776 | A | | 9/1999 | Hoehne | |
| 5,966,125 | A | | 10/1999 | Johnson | |
| 5,967,896 | A | | 10/1999 | Jorasch et al. | |
| 5,971,271 | A | | 10/1999 | Wynn et al. | |
| 5,971,850 | A | | 10/1999 | Liverance | |
| 5,977,955 | A | | 11/1999 | Jaeger | |
| 5,983,196 | A | | 11/1999 | Wendkos | |
| 5,984,779 | A | | 11/1999 | Bridgeman et al. | |
| 5,990,885 | A | | 11/1999 | Gopinath | |
| 6,001,016 | A | | 12/1999 | Walker et al. | |
| 6,003,013 | A | | 12/1999 | Boushy | |
| 6,003,651 | A | | 12/1999 | Waller et al. | |
| 6,004,211 | A | | 12/1999 | Brenner et al. | |
| 6,007,426 | A | | 12/1999 | Kelly et al. | |
| 6,009,150 | A | * | 12/1999 | Kamel | 379/88.22 |
| 6,010,404 | A | | 1/2000 | Walker et al. | |
| 6,012,983 | A | | 1/2000 | Walker et al. | |
| 6,015,344 | A | | 1/2000 | Kelly et al. | |
| 6,028,604 | A | | 2/2000 | Matthews, III et al. | |
| 6,029,046 | A | * | 2/2000 | Khan et al. | 725/31 |
| 6,032,955 | A | | 3/2000 | Luciano et al. | |
| 6,048,269 | A | | 4/2000 | Burns et al. | |
| 6,050,895 | A | | 4/2000 | Luciano, Jr. et al. | |
| 6,062,981 | A | | 5/2000 | Luciano, Jr. | |
| 6,068,101 | A | | 5/2000 | Dickenson et al. | |
| 6,068,552 | A | | 5/2000 | Walker et al. | |
| 6,070,878 | A | | 6/2000 | Jones et al. | |
| 6,071,190 | A | | 6/2000 | Weiss et al. | |
| 6,077,163 | A | | 6/2000 | Walker et al. | |
| 6,089,975 | A | | 7/2000 | Dunn | |
| 6,099,408 | A | | 8/2000 | Schneier et al. | |
| 6,102,394 | A | | 8/2000 | Wurz et al. | |
| 6,106,393 | A | | 8/2000 | Sunaga et al. | |
| 6,110,041 | A | | 8/2000 | Walker et al. | |
| 6,110,043 | A | | 8/2000 | Olsen | |
| 6,113,492 | A | | 9/2000 | Walker et al. | |
| 6,113,493 | A | | 9/2000 | Walker et al. | |
| 6,113,495 | A | | 9/2000 | Walker et al. | |
| 6,116,906 | A | | 9/2000 | Rifkin | |
| 6,117,010 | A | | 9/2000 | Canterbury et al. | |
| 6,126,542 | A | | 10/2000 | Fier | |
| 6,134,103 | A | | 10/2000 | Ghanma | |
| 6,135,884 | A | | 10/2000 | Hedrick et al. | |
| 6,146,273 | A | | 11/2000 | Olsen | |
| 6,146,274 | A | | 11/2000 | Salour et al. | |
| 6,149,522 | A | | 11/2000 | Alcorn et al. | |

6,152,822 A 11/2000 Herbert
6,162,121 A 12/2000 Morro et al.
6,162,122 A 12/2000 Acres et al.
6,164,645 A 12/2000 Weiss
6,165,069 A 12/2000 Sines et al.
6,165,072 A 12/2000 Davis et al.
6,183,362 B1 2/2001 Boushy
6,186,404 B1 2/2001 Ehrhart et al.
6,201,352 B1 3/2001 Ge et al.
6,201,532 B1 3/2001 Tode et al.
6,201,703 B1 3/2001 Yamada et al.
6,203,010 B1 3/2001 Jorasch et al.
6,203,427 B1 3/2001 Walker et al.
6,210,275 B1 4/2001 Olsen
6,213,875 B1 4/2001 Suzuki
6,227,970 B1 5/2001 Shimizu et al.
6,241,608 B1 6/2001 Torango
6,264,560 B1 7/2001 Goldberg et al.
6,264,561 B1 7/2001 Saffari
6,266,059 B1 7/2001 Matthews, III et al.
6,270,404 B2 8/2001 Sines et al.
6,270,409 B1 8/2001 Shuster
6,272,223 B1 8/2001 Carlson
6,275,217 B1 8/2001 Jaeger
6,287,201 B1 9/2001 Hightower
6,287,202 B1 9/2001 Pascal et al.
6,293,866 B1 * 9/2001 Walker et al. .................. 463/20
6,302,790 B1 10/2001 Brossard
6,315,663 B1 11/2001 Sakamoto
6,315,665 B1 11/2001 Faith
6,315,666 B1 11/2001 Mastera et al.
6,319,125 B1 11/2001 Acres
6,325,375 B1 12/2001 Potter et al.
6,342,901 B1 1/2002 Adler et al.
6,343,988 B1 2/2002 Walker et al.
6,346,044 B1 2/2002 McCrea, Jr.
6,350,199 B1 2/2002 Williams et al.
6,358,149 B1 3/2002 Schneider et al.
6,364,314 B1 4/2002 Canterbury
6,364,769 B1 4/2002 Weiss et al.
6,368,216 B1 4/2002 Hedrick et al.
6,375,567 B1 4/2002 Acres
6,388,714 B1 * 5/2002 Schein et al. ................ 348/563
6,394,907 B1 5/2002 Rowe
6,398,217 B1 6/2002 Shimizu et al.
6,409,602 B1 6/2002 Wiltshire et al.
6,435,970 B1 8/2002 Baerlocher et al.
6,439,993 B1 8/2002 O'Halloran
6,450,885 B2 9/2002 Schneier et al.
6,450,887 B1 9/2002 Mir et al.
6,454,649 B1 9/2002 Mattice et al.
6,456,977 B1 9/2002 Wang
6,471,591 B1 10/2002 Crumby
6,475,087 B1 11/2002 Cole
6,478,676 B1 11/2002 Dayan
6,491,298 B1 12/2002 Criss-Puszkiewicz et al.
6,504,990 B1 1/2003 Abecassis
6,508,709 B1 * 1/2003 Karmarkar ...................... 463/42
6,511,377 B1 1/2003 Weiss
6,520,308 B1 2/2003 Martin et al.
6,520,856 B1 * 2/2003 Walker et al. .................. 463/21
6,533,663 B1 3/2003 Iwao et al.
6,554,709 B1 4/2003 Brenner et al.
6,565,434 B1 5/2003 Acres
6,572,477 B2 6/2003 Hightower
6,585,592 B1 7/2003 Crumby
6,589,115 B2 7/2003 Walker
6,592,460 B2 7/2003 Torango
6,599,193 B2 7/2003 Baerlocher et al.
6,609,969 B1 8/2003 Luciano et al.
6,609,970 B1 8/2003 Luciano, Jr.
6,641,483 B1 11/2003 Luciano et al.
6,641,484 B2 11/2003 Oles et al.
6,645,068 B1 11/2003 Kelly et al.
6,645,077 B2 11/2003 Rowe
6,646,695 B1 11/2003 Gauselmann
6,675,152 B1 1/2004 Prasad et al.
6,685,567 B2 2/2004 Cockerille et al.
6,688,984 B2 2/2004 Cole
6,697,944 B1 * 2/2004 Jones et al. .................. 713/168
6,700,567 B1 3/2004 Jaeger et al.
6,709,333 B1 3/2004 Bradford et al.
6,712,698 B2 3/2004 Paulsen et al.
6,716,103 B1 * 4/2004 Eck et al. ........................ 463/45
6,719,631 B1 4/2004 Tulley et al.
6,722,985 B2 4/2004 Criss-Puszkiewicz et al.
6,724,385 B2 4/2004 Takatsuka et al.
6,729,956 B2 5/2004 Wolf et al.
6,743,098 B2 6/2004 Urie et al.
6,758,757 B2 7/2004 Luciano, Jr. et al.
6,769,688 B1 8/2004 Lean
6,769,982 B1 8/2004 Brosnan
6,776,715 B2 8/2004 Price
6,798,359 B1 9/2004 Ivancic
6,804,763 B1 10/2004 Stockdale et al.
6,835,133 B2 12/2004 Baerlocher et al.
6,843,720 B2 1/2005 Luciano et al.
6,852,031 B1 2/2005 Rowe
6,860,814 B2 3/2005 Cole
6,863,608 B1 3/2005 LeMay et al.
6,866,586 B2 3/2005 Oberberger et al.
6,880,825 B2 4/2005 Seelig et al.
6,884,170 B2 4/2005 Rowe
6,921,336 B1 * 7/2005 Best ................................ 463/32
6,929,549 B1 * 8/2005 Yamada .......................... 463/42
6,942,570 B2 * 9/2005 Schneier et al. ................ 463/17
6,942,574 B1 * 9/2005 LeMay et al. .................. 463/41
6,964,416 B2 * 11/2005 McClintic et al. ............ 273/273
6,976,919 B2 12/2005 Cole
6,979,266 B2 12/2005 Lemay et al.
6,984,174 B2 1/2006 Cannon et al.
6,997,810 B2 2/2006 Cole
7,008,319 B2 3/2006 Montgomery et al.
7,008,322 B1 3/2006 Suzuki et al.
7,071,845 B2 7/2006 Ivancic
7,083,520 B2 8/2006 Rowe
7,084,860 B1 8/2006 Jaeger et al.
7,113,175 B2 9/2006 Liu et al.
7,275,994 B2 * 10/2007 Eck et al. ........................ 463/45
7,470,197 B2 12/2008 Massey et al.
7,481,430 B1 1/2009 Jackson et al.
7,722,453 B2 5/2010 Lark et al.
7,883,413 B2 2/2011 Paulsen
7,918,738 B2 4/2011 Paulsen
2001/0008753 A1 7/2001 Wakamoto
2001/0028147 A1 10/2001 Ornstein et al.
2001/0036858 A1 11/2001 McNutt et al.
2002/0042297 A1 4/2002 Torango
2002/0050983 A1 5/2002 Liu et al.
2002/0077712 A1 6/2002 Safaei et al.
2002/0083179 A1 6/2002 Shaw et al.
2002/0098888 A1 7/2002 Rowe et al.
2002/0103027 A1 8/2002 Rowe et al.
2002/0141643 A1 10/2002 Jaeger
2002/0142815 A1 10/2002 Candelore
2002/0142825 A1 10/2002 Lark et al.
2002/0142846 A1 10/2002 Paulsen
2002/0147047 A1 10/2002 Letovsky et al.
2002/0147640 A1 10/2002 Daniele et al.
2002/0151366 A1 10/2002 Walker et al.
2002/0155874 A1 10/2002 Byrne
2002/0178446 A1 * 11/2002 Sie et al. ........................ 725/32
2002/0183106 A1 12/2002 Cole
2002/0193160 A1 12/2002 Tarantino
2002/0198052 A1 12/2002 Soltys et al.
2003/0003983 A1 * 1/2003 Walker et al. .................. 463/16
2003/0027630 A1 2/2003 Kelly et al.
2003/0032473 A1 * 2/2003 Rowe et al. .................... 463/25
2003/0050806 A1 3/2003 Friesen et al.
2003/0064805 A1 * 4/2003 Wells ............................. 463/39
2003/0073497 A1 4/2003 Nelson
2003/0083943 A1 5/2003 Adams et al.
2003/0100361 A1 5/2003 Sharpless et al.
2003/0144057 A1 * 7/2003 Brenner et al. ................ 463/40
2003/0148808 A1 8/2003 Price
2003/0163399 A1 * 8/2003 Harper et al. .................. 705/35
2003/0171149 A1 * 9/2003 Rothschild ...................... 463/42
2003/0176218 A1 * 9/2003 LeMay et al. .................. 463/25

| | | | | |
|---|---|---|---|---|
| 2003/0176220 | A1* | 9/2003 | Baerlocher | 463/26 |
| 2003/0181242 | A1 | 9/2003 | Lee et al. | |
| 2003/0190944 | A1 | 10/2003 | Manfredi | |
| 2003/0203756 | A1 | 10/2003 | Jackson | |
| 2003/0220135 | A1* | 11/2003 | Gauselmann | 463/25 |
| 2004/0002379 | A1 | 1/2004 | Parrott et al. | |
| 2004/0018870 | A1 | 1/2004 | Cole | |
| 2004/0087370 | A1 | 5/2004 | Tarantino | |
| 2004/0107821 | A1* | 6/2004 | Alcalde et al. | 84/608 |
| 2004/0111745 | A1* | 6/2004 | Schein et al. | 725/46 |
| 2004/0116174 | A1 | 6/2004 | Baerlocher et al. | |
| 2004/0139318 | A1* | 7/2004 | Fiala et al. | 713/165 |
| 2004/0147314 | A1 | 7/2004 | LeMay et al. | |
| 2004/0185931 | A1* | 9/2004 | Lowell et al. | 463/17 |
| 2004/0242324 | A9* | 12/2004 | Walker et al. | 463/40 |
| 2005/0026702 | A1 | 2/2005 | Cole | |
| 2005/0037843 | A1 | 2/2005 | Wells et al. | |
| 2005/0050571 | A1* | 3/2005 | Wisnudel et al. | 720/718 |
| 2005/0059458 | A1 | 3/2005 | Griswold et al. | |
| 2005/0096125 | A1* | 5/2005 | LeMay et al. | 463/25 |
| 2005/0113163 | A1 | 5/2005 | Mattice et al. | |
| 2005/0143176 | A1 | 6/2005 | Cole | |
| 2005/0170890 | A1 | 8/2005 | Rowe et al. | |
| 2005/0255924 | A1 | 11/2005 | Cole | |
| 2006/0014586 | A1 | 1/2006 | Gatto | |
| 2006/0025193 | A1* | 2/2006 | Gail et al. | 463/16 |
| 2006/0030412 | A1 | 2/2006 | Cole | |
| 2006/0095331 | A1* | 5/2006 | O'Malley et al. | 705/22 |
| 2006/0166740 | A1* | 7/2006 | Sufuentes | 463/40 |
| 2006/0189387 | A1 | 8/2006 | Rigsby et al. | |
| 2006/0194633 | A1 | 8/2006 | Paulsen | |
| 2006/0199640 | A1 | 9/2006 | Emori et al. | |
| 2006/0217200 | A1 | 9/2006 | Rowe | |
| 2006/0247047 | A1 | 11/2006 | Mitchell et al. | |
| 2006/0247048 | A1 | 11/2006 | Mitchell et al. | |
| 2006/0290530 | A1 | 12/2006 | Ivancic | |
| 2007/0032949 | A1 | 2/2007 | Arai et al. | |
| 2007/0054738 | A1 | 3/2007 | Muir | |
| 2007/0072678 | A1 | 3/2007 | Dagres | |
| 2007/0077984 | A1 | 4/2007 | Aida et al. | |
| 2007/0155490 | A1 | 7/2007 | Phillips et al. | |
| 2007/0167229 | A1* | 7/2007 | LeMay et al. | 463/29 |
| 2007/0203971 | A1* | 8/2007 | Walker et al. | 709/201 |
| 2007/0282678 | A1* | 12/2007 | Dendi et al. | 705/14 |
| 2008/0020845 | A1 | 1/2008 | Low et al. | |
| 2008/0032787 | A1 | 2/2008 | Low et al. | |
| 2008/0054561 | A1* | 3/2008 | Canterbury et al. | 273/148 B |
| 2008/0076548 | A1 | 3/2008 | Paulsen | |
| 2008/0146326 | A1 | 6/2008 | Morrow et al. | |
| 2008/0167954 | A1* | 7/2008 | Kawakami | 705/14 |
| 2008/0204428 | A1* | 8/2008 | Pierce et al. | 345/174 |
| 2008/0224822 | A1* | 9/2008 | Gelman et al. | 340/5.2 |
| 2008/0270579 | A1* | 10/2008 | Herz et al. | 709/219 |

FOREIGN PATENT DOCUMENTS

| | | |
|---|---|---|
| DE | 4403688 A1 | 8/1995 |
| DE | 19905076 | 5/2000 |
| DE | 19944140 | 3/2001 |
| EP | 0 274 879 | 7/1988 |
| EP | 0 769 769 | 4/1997 |
| EP | 0887753 | 12/1998 |
| EP | 0 896 305 | 2/1999 |
| EP | 0 896 308 | 2/1999 |
| EP | 1039423 | 9/2000 |
| EP | 1 074 954 | 2/2001 |
| EP | 1087323 | 3/2001 |
| EP | 1136930 | 3/2001 |
| EP | 1 298 604 | 4/2003 |
| EP | 0396829 A2 | 3/2004 |
| EP | 1396829 A2 | 3/2004 |
| EP | 1 482 459 | 12/2004 |
| EP | 1 544 025 | 6/2005 |
| EP | 1 686 549 | 8/2006 |
| GB | 2383880 A | 7/2003 |
| WO | WO 94/24683 | 10/1994 |
| WO | WO 98/50876 | 11/1998 |
| WO | WO 00/38089 | 6/2000 |
| WO | WO 00/76239 | 12/2000 |
| WO | WO 00/79489 | 12/2000 |
| WO | WO 01/75815 | 10/2001 |
| WO | WO02/01458 A2 | 1/2002 |
| WO | WO 02/24288 | 3/2002 |
| WO | WO 02/77935 | 10/2002 |
| WO | WO 2004/024269 | 3/2004 |
| WO | 2004/027584 | 4/2004 |
| WO | WO 2004/056432 | 7/2004 |
| WO | 2005/028056 | 3/2005 |
| WO | WO 2007/032949 | 3/2007 |
| WO | WO 2008/013734 | 1/2008 |
| WO | WO 2008/066686 | 6/2008 |

OTHER PUBLICATIONS

Communication Pursuant to Article 96(2) EPC, European Patent Office, Sep. 1, 2004, Application No. 02 728 584.0-2221.

Communication Pursuant to Article 96(2) EPC, European Patent Office, Aug. 16, 2005, Application No. 02 728 584.0-2221.

PCT International Search Report and Written Opinion mailed Nov. 24, 2005 for International Application No. PCT/US2005/026696.

Microsoft Windows 95, 1995, Microsoft Corporation, pp. 12-16 (4 pages).

International Search Report from corresponding PCT application PCT/US03/27137 mailed Jan. 15, 2004.

Office Action from related U.S. Appl. No. 10/242,149, dated May 6, 2004, 10 pages.

Final Office Action from related U.S. Appl. No. 10/242,149, dated Dec. 2, 2004, 9 pages.

Office Action from related U.S. Appl. No. 10/242,149, dated Mar. 22, 2005, 11 pages.

Office Action from related U.S. Appl. No. 10/242,149, dated Nov. 15, 2005, 13 pages.

Office Action dated Nov. 7, 2002 from corresponding U.S. Appl. No. 09/819,152.

Final Office Action dated Apr. 29, 2003 from corresponding U.S. Appl. No. 09/819,152.

Office Action dated Sep. 8, 2003 from corresponding U.S. Appl. No. 09/819,152.

Final Office Action dated Apr. 13, 2004 from corresponding U.S. Appl. No. 09/819,152.

Office Action dated Dec. 14, 2004 from corresponding U.S. Appl. No. 09/819,152.

Final Office Action dated Oct. 13, 2006 from corresponding U.S. Appl. No. 09/819,152.

Office Action dated Mar. 27, 2007 from corresponding U.S. Appl. No. 09/819,152.

International Search Report and Written Opinion dated Feb. 27, 2006 form a related PCT Application No. PCT/US2005/036116 (10 pages).

Office Action mailed Jun. 15, 2004 from corresponding U.S. Appl. No. 10/106,992.

Final Office Action mailed Nov. 14, 2005 from corresponding U.S. Appl. No. 10/106,992.

Office Action mailed Dec. 5, 2006 from corresponding U.S. Appl. No. 10/106,992.

Final Office Action mailed Jul. 23, 2007 from corresponding U.S. Appl. No. 10/106,992.

International Search Report from PCT Application No. PCT/US02/09425, dated May 28, 2003, 10 pages.

Final Office Action dated Dec. 13, 2007 from U.S. Appl. No. 09/819,152.

John Scarne, Scarne's New Complete Guide to Gambling, 1974, Simon and Schuster, pp. 39-41.

U.S. Office Action dated Oct. 24, 2008 from U.S. Appl. No. 10/106,992, 30 pgs.

U.S. Office Action dated Oct. 16, 2008 from U.S. Appl. No. 11/459,245; 30 pgs.

U.S. Final Office Action dated Jan. 12, 2009 from U.S. Appl. No. 09/819,152; 14 pgs.

Australian Exam Report dated Feb. 25, 2009 from Application No. 2007201929, 1 pg.

U.S. Office Action dated Mar. 31, 2009 from U.S. Appl. No. 11/372,549, 9 pgs.

U.S. Appl. No. 11/558,853, dated Nov. 10, 2006, Waxman et al.

U.S. Appl. No. 11/558,860, dated Nov. 10, 2006, Waxman.
US Advisory Action dated Jul. 15, 2003 issued in U.S. Appl. No. 09/819,152.
US Examiner Interview Summary dated Apr. 7, 2005 issued in U.S. Appl. No. 09/819,152.
US Advisory Action dated Dec. 28, 2006 issued in U.S. Appl. No. 09/819,152.
US Examiner Interview Summary dated Jul. 6, 2007 issued in U.S. Appl. No. 09/819,152.
US Office Action dated Jun. 3, 2008 issued in U.S. Appl. No. 09/819,152.
US Office Action dated Aug. 4, 2009 issued in U.S. Appl. No. 09/819,152.
US Notice of Allowance dated Aug. 2, 2010 issued in U.S. Appl. No. 09/819,152.
US Notice of Allowance dated Oct. 18, 2010 issued in U.S. Appl. No. 09/819,152.
US Notice of Allowance dated Jan. 26, 2011 issued in U.S. Appl. No. 09/819,152.
US Office Action (Examiner Interview Summary) dated Jul. 27, 2004 issued in U.S. Appl. No. 10/106,992.
US Office Action dated Dec. 31, 2007 issued in U.S. Appl. No. 10/106,992.
US Office Action (Notification of Non-Compliant Appeal Brief (37 CFR 41.37) dated Jul. 20, 2009 issued in U.S. Appl. No. 10/106,992.
US Notice of Allowance dated Jan. 13, 2010 issued in U.S. Appl. No. 10/106,992.
US Office Action (Miscellaneous Communication to Applicant) dated Mar. 12, 2010 issued in U.S. Appl. No. 10/106,992.
US Office Action (Miscellaneous Communication to Applicant) dated Mar. 15, 2010 issued in U.S. Appl. No. 10/106,992.
US Office Action dated Jan. 31, 2008 issued in U.S. Appl. No. 11/372,549.
US Office Action Final dated Sep. 18, 2008 issued in U.S. Appl. No. 11/372,549.
US Office Action dated May 19, 2010 issued in U.S. Appl. No. 11/372,549.
US Office Action Final dated Oct. 28, 2010 issued in U.S. Appl. No. 11/372,549.
US Office Action dated Sep. 5, 2012 issued in U.S. Appl. No. 11/372,549.
US Office Action dated Oct. 2, 2008 issued in U.S. Appl. No. 11/830,796.
US Office Action dated Aug. 5, 2009 issued in U.S. Appl. No. 11/830,796.
US Notice of Allowance dated Jun. 3, 2010 issued in U.S. Appl. No. 11/830,796.
US Notice of Allowance dated Sep. 20, 2010 issued in U.S. Appl. No. 11/830,796.
US Office Action dated Dec. 2, 2003 issued in U.S. Appl. No. 10/242,149.
US Examiner Interview Summary dated May 3, 2005 issued in U.S. Appl. No. 10/242,149.
US Examiner Interview Summary dated Jan. 18, 2006 issued in U.S. Appl. No. 10/242,149.
US Notice of Allowance dated Apr. 3, 2006 issued in U.S. Appl. No. 10/242,149.
US Office Action dated Dec. 16, 2009 issued in U.S. Appl. No. 11/445,656.
US Office Action dated Apr. 28, 2009 issued in U.S. Appl. No. 11/459,245.
US Office Action Final dated Dec. 9, 2009 issued in U.S. Appl. No. 11/459,245.
US Advisory Action dated Mar. 23, 2010 issued in U.S. Appl. No. 11/459,245.
US Office Action Final dated May 27, 2011 issued in U.S. Appl. No. 11/459,245.
US Office Action Final dated Oct. 27, 2011 issued in U.S. Appl. No. 11/459,245.
US Advisory Action dated Feb. 17, 2012 issued in U.S. Appl. No. 11/459,245.
US Office Action dated Dec. 21, 2010 issued in U.S. Appl. No. 11/829,918.
US Office Action dated Feb. 5, 2009 issued in U.S. Appl. No. 11/598,254.
US Office Action dated Aug. 17, 2007 issued in U.S. Appl. No. 10/958,843.
US Office Action dated Mar. 25, 2008 issued in U.S. Appl. No. 10/958,843.
US Office Action dated Sep. 15, 2008 issued in U.S. Appl. No. 10/958,843.
US Office Action dated Jun. 24, 2008 issued in U.S. Appl. No. 11/064,217.
US Final Office Action Final dated Jan. 29, 2009 issued in U.S. Appl. No. 11/064,217.
PCT International Written Opinion dated Jul. 18, 2003 issued in PCT/US2002/009425.
PCT International Preliminary Examination Report dated Sep. 8, 2003 issued in PCT/US2002/009425.
Australian Examiner's First Report dated Mar. 20, 2006 issued in Application No. 2002258628.
EP Summons to attend oral proceedings pursuant to Rule 71(1) EPC dated Jun. 19, 2006 issued in 02 728 584.0/2221.
EP Decision to Refuse a European Patent application (Oral Proceedings) and Provision of a copy of the minutes in accordance with Rule 76(4) EPC dated Dec. 18, 2006 issued in 02 728 584.0/2221.
Australian Examination Report dated Jan. 8, 2009 issued in Application No. 2003260132.
Australian Notice of Acceptance dated Feb. 1, 2010 issued in Application No. 2003260132.
European Examination Report dated Nov. 14, 2007 issued in Ep Application No. 05 807 613.4.
PCT International Search Report and Written Opinion dated Jul. 26, 2006 issued in PCT/US2006/005677.
European Examination Report dated Jan. 16, 2008 issued in EP Application No. 06 735 371.4.
PCT International Search Report and Written Opinion dated Apr. 16, 2008 issued in PCT/US2007/016367.
PCT International Preliminary Report on Patentability dated Feb. 5, 2009 issued in PCT/US2007/016367.
Australian Examiner's first report dated Jun. 2, 2011 issued in AU 2007277338.
Australian Examiner's report No. 2 dated Apr. 10, 2012 issued in AU 2007277338.
PCT International Search Report dated Aug. 11, 2008 issued in PCT/US2007/023568.
PCT International Preliminary Report on Patentability and Written Opinion dated May 12, 2009 issued in PCT/US2007/023568.
European Examination Report dated Oct. 16, 2009 issued in EP 07 861 853.5-2221.
PCT International Search Report and Written Opinion dated Apr. 4, 2008 issued in Application No. PCT/US2007/084131.
PCT International Search Report and Written Opinion dated May 14, 2008 issued in Application No. PCT/US2007/084164.
PCT International Search Report and Written Opinion dated May 7, 2008 issued in Application No. PCT/US2007/023564.
European Office Action dated Dec. 20, 2005 issued in EP Application No. 02773484.7.
European Office Action dated Jan. 12, 2007 in related EP Application No. 02773484.7.
PCT International Search Report and Written Opinion dated Jun. 14, 2006 issued in PCT/US2006/005685.
International Search Report and Written Opinion dated Jun. 14, 2006 issued in PCT/US2006/005455.
Bricklin, Dan (Nov. 22, 2002) About Tablet Computing Old and New, http://www.bricklin.com/tabletcomputing.htm (pp. 1-7).
Fischetti, Mark (Apr. 2001) Touch Screens: At Your Fingertips, Scientific American, (pp. 102-103).
Yao, Paul (May 1998) Microsoft Windows CE 2.0: It's Not Just for Handheld PCs Any More . . . MSJ; www.microsoft.com/msg/0598/wince.aspx (pp. 1 - 23).
Wang Z et al.; "Casino Technology: Player Tracking and Slot Accounting Systems" Gaming Research and Review Journal, UNLV International Gaming Institute, Las Vegas, NV, U.S.Vol, 6, No. 1, 2000, pp. 43-56, XP001149561, ISSN: 1531-0930, the whole document (14 pages).

* cited by examiner

| Game Structure | | | | | |
|---|---|---|---|---|---|
| *Pos.* | *1st Reel* | *2nd Reel* | *3rd Reel* | *4th Reel* | *5th Reel* |
| 1 | Q | E | Q | 10 | A |
| 2 | C | 10 | J | K | 10 |
| 3 | A | K | D | J | J |
| 4 | J | B | 10 | D | Q |
| 5 | D | 9 | Q | 9 | B |
| 6 | K | A | B | K | K |
| 7 | E | M | 9 | 10 | 9 |
| 8 | 10 | Q | K | A | A |
| 9 | M | K | J | J | 10 |
| 10 | 9 | D | E | Q | E |
| 11 | D | J | 10 | 9 | Q |
| 12 | K | E | M | B | J |
| 13 | Q | 10 | 9 | Q | A |
| 14 | E | C | C | 10 | 9 |
| 15 | 10 | 9 | 10 | A | M |
| 16 | A | E | K | J | Q |
| 17 | B | K | J | S | 10 |
| 18 | J | M | D | 9 | K |
| 19 | S | D | 9 | K | 9 |
| 20 | 9 | Q | A | 10 | A |
| 21 | C | K | 10 | C | 10 |
| 22 | Q | E | B | J | J |
| 23 | M | J | 9 | M | K |
| 24 | 10 | C | A | 9 | 9 |
| 25 | A | 9 | J | Q | C |
| 26 | E | S | S | E | 10 |
| 27 | J | Q | Q | 10 | Q |
| 28 | K | D | 10 | J | 9 |
| 29 | D | J | C | 9 | A |
| 30 | 9 | A | Q | Q | J |
| 31 | | | J | | K |
| 32 | | | A | | 10 |
| 33 | | | 9 | | B |
| 34 | | | | | 9 |
| 35 | | | | | Q |
| 36 | | | | | S |

500

510

FIG. 5
(Prior Art)

520

Exemplary Paytable – Game Mode (Dollars)

| | Symbol - Kind | | 1K | 2K | 3K | 4K | 5K |
|---|---|---|---|---|---|---|---|
| 1 | Nugget | Ng | 0 | 5 | 200 | 2500 | 5000 |
| 2 | Note | Nt | 0 | 5 | 50 | 200 | 2000 |
| 3 | Safe | Sf | 0 | 0 | 30 | 200 | 1500 |
| 4 | **Money** | **M** | **0** | **0** | **20** | **50** | **1000** |
| 5 | King | Kg | 0 | 0 | 15 | 30 | 500 |
| 6 | Queen | Qn | 0 | 0 | 10 | 20 | 300 |
| 7 | Jack | Jk | 0 | 0 | 10 | 15 | 300 |
| 8 | Ace | Ac | 0 | 2 | 5 | 10 | 200 |
| 9 | Ten | Tn | 0 | 2 | 5 | 10 | 200 |
| 10 | Nine | Nn | 0 | 2 | 5 | 10 | 150 |
| 11 | Eight | Et | 0 | 2 | 5 | 10 | 150 |
| 12 | Seven | Sv | 0 | 2 | 3 | 5 | 100 |

RNG Results – Game Mode

530

| *1st Reel* | *2nd Reel* | *3rd Reel* | *4th Reel* | *5th Reel* |
|---|---|---|---|---|
| 15 | 3 | 10 | 30 | 21 |

Results

540

| *1st Reel* | *2nd Reel* | *3rd Reel* | *4th Reel* | *5th Reel* |
|---|---|---|---|---|
| 10 | K | E | Q | 10 |

Payout

2

FIG. 6
(Prior Art)

Exemplary Paytable – Preview Mode (Dollars) 600

| | Symbol - Kind | | 1K | 2K | 3K | 4K | 5K |
|---|---|---|---|---|---|---|---|
| 1 | Nugget | Ng | 0 | 1 | 2 | 3 | 5 |
| 2 | Note | Nt | 0 | 1 | 2 | 2 | 3 |
| 3 | Safe | Sf | 0 | 0 | 2 | 2 | 3 |
| 4 | **Money** | **M** | **0** | **0** | **2** | **2** | **3** |
| 5 | King | Kg | 0 | 0 | 1 | 2 | 2 |
| 6 | Queen | Qn | 0 | 0 | 1 | 1 | 2 |
| 7 | Jack | Jk | 0 | 0 | 1 | 1 | 2 |
| 8 | Ace | Ac | 0 | 0 | 1 | 1 | 2 |
| 9 | Ten | Tn | 0 | 0 | 1 | 1 | 2 |
| 10 | Nine | Nn | 0 | 0 | 1 | 1 | 2 |
| 11 | Eight | Et | 0 | 0 | 1 | 1 | 2 |
| 12 | Seven | Sv | 0 | 0 | 1 | 1 | 2 |

Predetermined Results – Preview Mode 610

| *1st Reel* | *2nd Reel* | *3rd Reel* | *4th Reel* | *5th Reel* |
|---|---|---|---|---|
| 9 | 17 | 12 | 6 | 31 |

Results 620

| *1st Reel* | *2nd Reel* | *3rd Reel* | *4th Reel* | *5th Reel* |
|---|---|---|---|---|
| M | K | M | K | K |

Payout 630

1

FIG. 7

METHOD AND APPARATUS FOR PREVIEWING A GAME

CROSS-REFERENCE TO RELATED APPLICATIONS

This application is related to U.S. patent application Ser. No. 10/106,992, filed on Mar. 26, 2002, and also U.S. patent application Ser. No. 09/819,152, filed on Mar. 27, 2001, both of which are incorporated herein by reference in their entireties.

BRIEF DESCRIPTION OF THE INVENTION

This invention relates to gaming machines. More specifically, this invention relates to a method and apparatus for previewing a game on a gaming machine.

BACKGROUND OF THE INVENTION

Modern casinos and other gaming establishments often overwhelm players with the number and type of gaming machines available. Potential users or players of gaming machines are often given a choice of games such as slot machines, video poker, keno, blackjack, and many other games of skill and/or chance. Presented with a multitude of unfamiliar games, players often play only a select few favorites, or simply do not play any at all. This situation is exacerbated by the fact that most games require money to play. Thus, even if a game is potentially appealing to players, they often will not spend money to try an unfamiliar game, with the result being a loss of business to the gaming establishment and/or slow introduction of new machine types.

Methods of attracting players to unfamiliar games on unfamiliar gaming machines thus would help gaming establishments attract further business. In addition, players benefit by gaining access and familiarity to a wider variety of games, many of which they may not have been familiar with. It is therefore desirable to develop ways to allow players to preview games, so as to introduce them to those games that may have previously been unfamiliar to them.

SUMMARY OF THE INVENTION

Broadly speaking, the invention pertains to previewing a game on a gaming machine. A portable sample play device, such as a player tracking card or other player-carried device, allows players or users of a gaming machine to view, and/or participate in, sample or preview play of a game. The portable sample play device can be a smart card that stores all necessary information itself, or a known magnetic stripe card that simply stores rudimentary information such as an identification number. Additionally, such a sample or preview can include many different modes of play. For instance, the gaming machine can display a preview of link progressive play, along with the progressive jackpot. It can also display the special bonus modes of various games, demonstrating to the player various special prizes than can be won. Such preview play can be interactive, allowing player participation, or passive, simply illustrating sample play without allowing user interaction. Preview play can also include full, nominal, zero, or other payouts if so desired.

The invention can be implemented in numerous ways, including as a method, system, device, and apparatus. Several embodiments of the invention are discussed below.

As a gaming machine system, one embodiment of the invention comprises a gaming machine configured to display a game and a preview of the game, and a portable sample play device configured to be carried by a user of the gaming machine. The gaming machine is further configured to initiate the preview of the game upon selective communication of the sample play device therewith.

As a tracking card for use with a gaming machine, one embodiment of the invention comprises a memory storing information identifying a user, and a microprocessor. The microprocessor is in electronic communication with the memory, and configured to instruct the gaming machine to initiate a preview of a game on the gaming machine when the tracking card is in communication therewith.

As a method of previewing a game, one embodiment of the invention comprises, in a gaming machine configured to display a game and a preview of the game, receiving from a tracking card information related to a user of the gaming machine. The preview of the game is initiated in response to the receiving of the information.

Other aspects and advantages of the invention will become apparent from the following detailed description taken in conjunction with the accompanying drawings which illustrate, by way of example, the principles of the invention.

BRIEF DESCRIPTION OF THE DRAWINGS

For a better understanding of the invention, reference should be made to the following detailed description taken in conjunction with the accompanying drawings, in which:

FIG. 5 illustrates an exemplary prior art symbol distribution table for use in determining outcomes of a slot game.

FIG. 6 illustrates an exemplary prior art paytable, generated outcome, and results as seen by the player.

FIG. 7 illustrates an exemplary paytable, generated outcome, and results as seen by the player, in accordance with an embodiment of the present invention.

Like reference numerals refer to corresponding parts throughout the drawings.

DETAILED DESCRIPTION OF THE INVENTION

In one embodiment of the invention, a player is given a portable sample play device, such as a tracking card, that allows the user to preview a new game on a gaming machine. Information stored in the sample play device prompts the game machine to display a preview of the game, familiarizing the user with a new and unfamiliar game, and perhaps displaying to him/her the potential prizes that can be won. In this manner, players are given a new vehicle for learning about unfamiliar games, allowing gaming establishments to perhaps gain revenue from game machines that would have otherwise been neglected by players, and players to find more, and more interesting, games to play.

Figure 1:
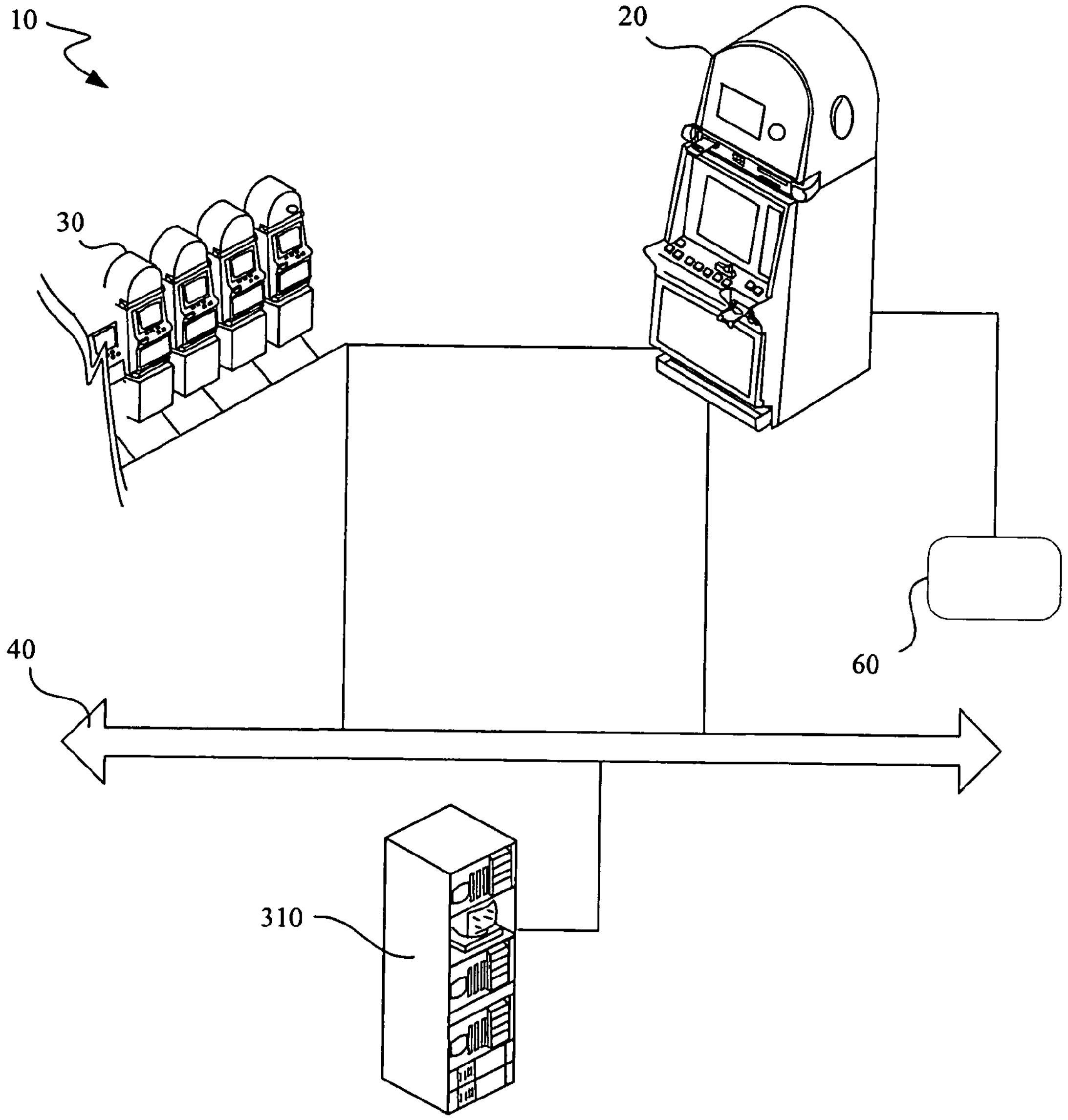
FIG. 1 illustrates a gaming machine system configured to operate in accordance with an embodiment of the present invention.

FIG. 1 illustrates a gaming machine system configured to operate in accordance with an embodiment of the invention. The gaming machine system 10 includes at least one gaming machine 20 at a particular location, remote gaming machines 30 at another location, a bus 40, and a back-end server 50. The gaming machines 20, 30 and the back-end server 50 communicate with each other electronically via the bus 40, which is simply a known data transmission line. Each gaming machine 20, 30 is a known device capable of allowing a player to play a game, and dispensing rewards, monetary or otherwise, as appropriate. The configuration of the gaming machine system 10 encompasses embodiments in which the back-end server 50 controls the operation of the gaming machines 20, 30. The system 10 also encompasses embodiments in which the gaming machines 20, 30 are each stand-alone units capable of operating play of their games largely without the back-end server 50. Like gaming machine 20, gaming machines 30 are configured to allow a player to play a game. The gaming machines 30 are shown as separate from gaming machine 20 simply to illustrate the fact that various embodiments of the invention can be utilized within systems 10 that have multiple networked gaming machines.

Figure 2A:
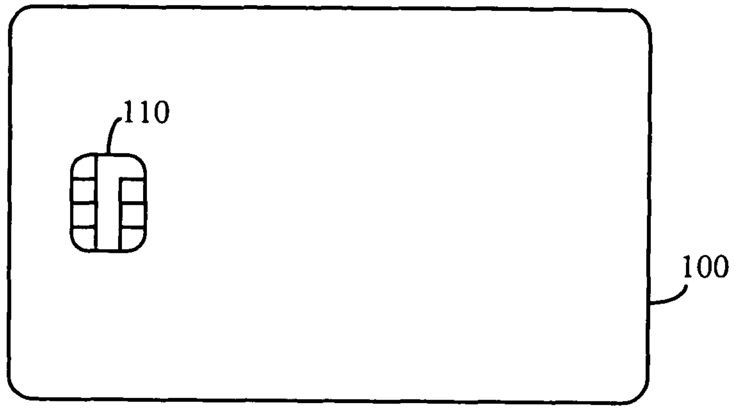
FIGS. 2A-B respectively illustrate an exemplary smart player tracking card and a block diagram of representative card components configured for use in connection with an embodiment of the present invention.
Figure 2B:
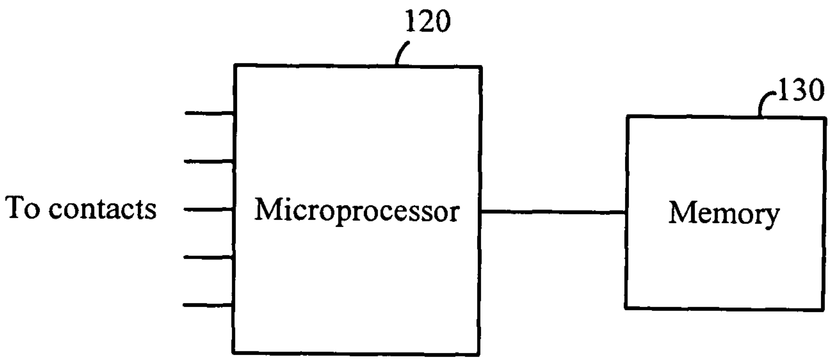
Figure 2C:
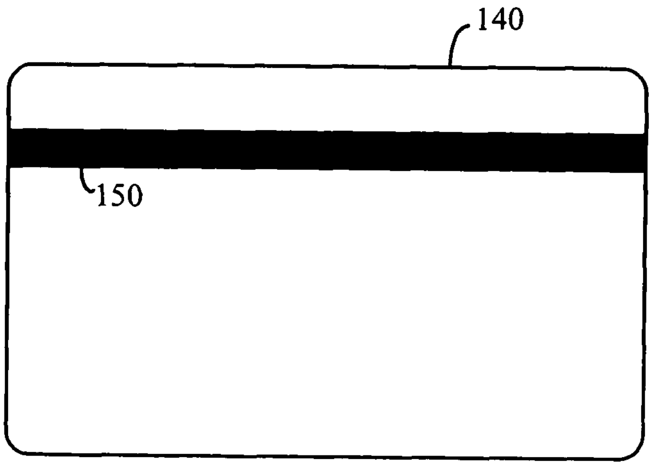
FIG. 2C illustrates an exemplary magnetic stripe player tracking card configured for use in connection with an embodiment of the present invention.

Also included in the system 10 is a portable sample play device 60 that can be carried by players. The sample play device 60 can be a known player tracking card that stores information. In such a case, the gaming machine 20 can be equipped with a known card reader, allowing players to insert their tracking cards into the gaming machine 20 to be read before or during game play. The sample play device 60 can be any device that can be carried by a player and that can store information. As discussed above, it is often convenient for the sample play device 60 to be a player tracking card, as such cards are known and widely used by players already. FIGS. 2A-C illustrate two different types of player tracking cards, each capable of being used in connection with the invention. FIGS. 2A-B illustrate an exemplary "smart" player tracking card 100 having contacts 110 on its outer surface, as well as internal components including a microprocessor 120 and memory 130. The microprocessor 120 and memory 130 are in electronic communication, allowing the microprocessor 120 to store information in, and retrieve information from, the memory 130. The microprocessor 120 is also electrically connected to the contacts 110, allowing it to interface with external devices and systems.

In the operation of a gaming machine system 10 utilizing smart cards 100, players insert their tracking cards 100 into a gaming machine 20. The microprocessor 120 then retrieves information from the memory 130 and transmits it to the gaming machine 20. The information can include such items as time information indicating how much sample play time remains, as well as various parameters of the sample game, and perhaps identification identifying the player. Receipt of this information prompts the gaming machine 20 to initiate a preview of the game.

FIG. 2C illustrates an exemplary magnetic stripe tracking card 140. In contrast to the smart tracking card 100, the magnetic stripe tracking card 140 does not contain a microprocessor 120. Instead, its magnetic stripe 150 stores a relatively small amount of information, such as an identification number, that can be read by a known card reader. Operation of a gaming machine system 10 utilizing magnetic stripe tracking cards 140 typically requires the presence of the back-end server 50 to provide information that cannot be stored on the card 140. Commonly, the gaming machine 20 automatically retrieves an identification number stored on the card 140, and sends it to the back-end server 50. The back-end server 50 checks the identification number to determine whether the user of that particular card 140 is entitled to sample play and, if so, initiates sample play on the gaming machine 20.

As discussed above, the sample play device 60 can be any device capable of being used by a player, and also capable of storing information. As such, the invention is not limited to the tracking cards 100, 140 described above. Rather, any device capable of storing information can be employed. For instance, payment tickets such as those used in the EZ Pay® system produced by IGT can be simply printed tickets that show a monetary amount to be paid to a player. Such tickets can be modified to include information for implementing the various embodiments of the invention, such as the information stored on the tracking cards 100, 140 to govern preview play.

Figure 3:
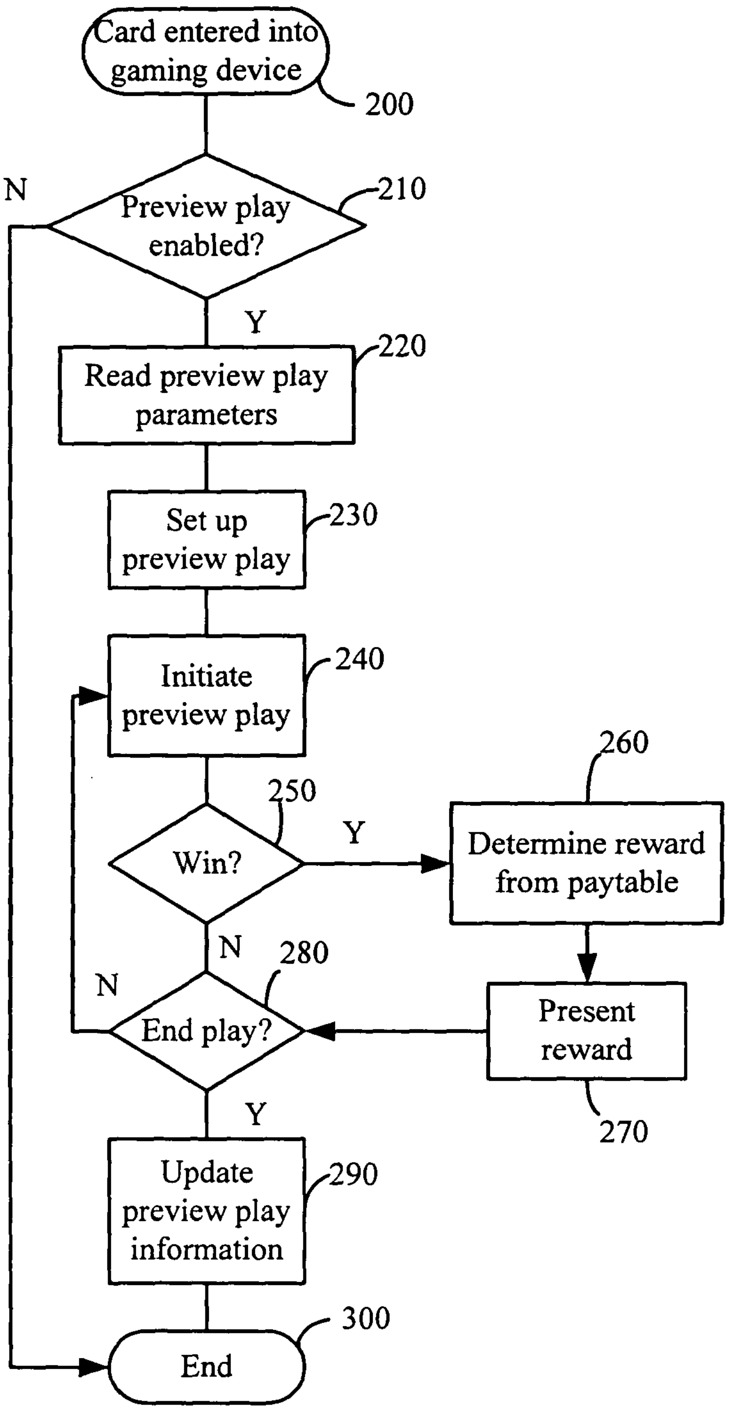
FIG. 3 illustrates process steps for allowing a player to preview a game by using a smart player tracking card in accordance with an embodiment of the present invention.

Attention now turns to a more detailed explanation of this process by which the smart tracking cards 100 are used to initiate a sample or preview game on gaming machines 20, 30. FIG. 3 illustrates a flow diagram, in accordance with an embodiment of the present invention, that allows a player to preview a game on a display of a gaming machine by using a smart player tracking card. As mentioned, the information stored within the smart card 100 can render the back-end server 50 unnecessary for many tasks, often allowing the game machine 20, 30 to carry out many aspects of sample play by itself The smart card 100 is first inserted into, or otherwise placed in electronic communication with, a gaming device 20 (step 200). Stored in the memory 130 is a flag or other information indicating whether the player in possession of this particular smart card 100 is allowed preview play, as will be described below. The gaming machine 20 reads this information (step 210), and if the player is not allowed preview play, the session ends (step 300).

However, if preview play is allowed, the various parameters of preview play are read (step 220), and the gaming machine 20 sets up preview play according to these parameters (step 230). The parameters, then, are basically instruction sets that govern play of this game. For example, the parameters can include paytable values that indicate how much payment, if any, could be awarded to the player upon a favorable outcome such as a winning card hand. The parameters can also include such things as a predetermined set of outcomes, or a specified percent chance of winning. Thus, the smart card 100 can instruct a gaming machine 20 to display preview play in a manner indicating a higher incidence of winning, so as to promote player interest and attractiveness. The card 100 can also set up preview play illustrating a specific sequence of outcomes, so that in a slot game, for instance, the player is guaranteed to see a four King outcome, or in video poker, the player is guaranteed to be dealt a full house. Such favorable outcomes make the game more attractive to the player, in part by demonstrating possible outcomes of interest to the player. Text or other indicators can also be displayed, tending to highlight the fact that game play can result in such favorable outcomes. Those of skill will recognize that the smart card 100 can store these and other parameters, allowing for sample game play that is configured in any desired manner.

Once preview play is set up according to the parameters stored in the smart card 100, preview play is initiated (step 240). As discussed above, this preview play can be interactive, permitting players to play hands of video poker or play a slot game, for instance. Preview play can also be passive, with the various parameters instructing the gaming machine 20 to simply show players, for example, card hands they could have been dealt or slot machine outcomes they could have received.

If a player wins, or is shown a winning outcome (step 250), the gaming machine 20 determines the appropriate award from the paytable (step 260), and presents that award to the player (270). Often, it is desired that preview play merely demonstrate to players how to play the game, and does not illustrate any monetary rewards. In these situations, the parameters stored on the smart card 100 include paytable values of zero, instructing the gaming machine 20 not to award any money to the player.

To further entice players, however, the smart card 100 can also include information instructing the gaming machine 20 to apply its "normal" playtable(s) to determine and display what reward the player could have been awarded had they actually played the game.

The smart card 100 can also store information indicating whether preview play should end at some point. For example, the smart card 100 can store time information indicating how long preview play should continue before it terminates, or information indicating how many hands, rounds, or the like can be played. In these cases, the gaming machine 20 checks to determine whether play should be ended (step 280). Preview play can also be ended voluntarily if the player desires. If either of these situations occurs, the gaming machine 20 updates the preview play information to indicate how much, if any, preview play remains (in the case that preview play time has expired, or the specified number of hands/rounds/etc. has been played, that time would be zero) (step 290), and play ends at step 300. If play is to continue, the process returns to step 240 instead.

Figure 4:
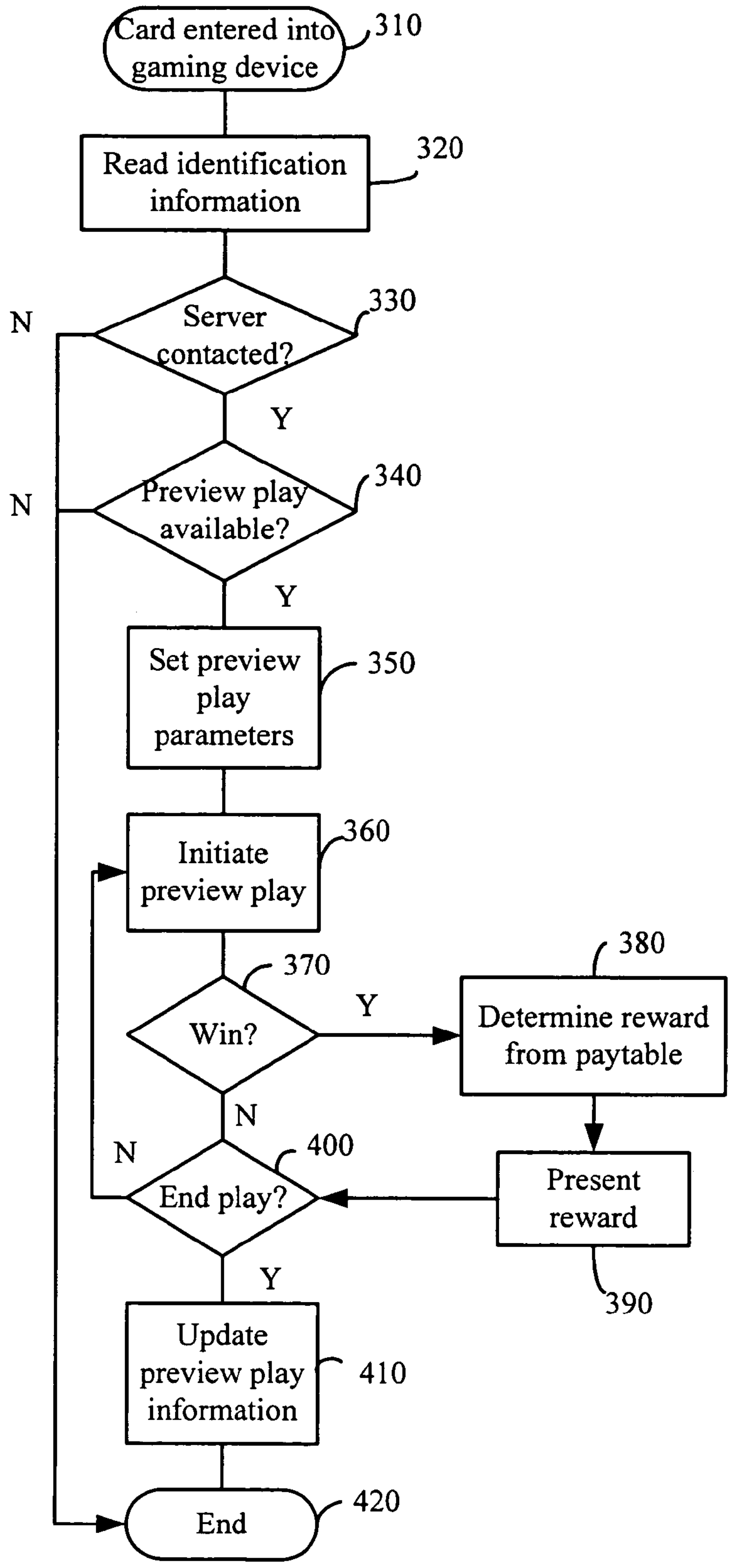
FIG. 4 illustrates process steps for allowing a player to preview a game by using a magnetic stripe player tracking card in accordance with an embodiment of the present invention.

In contrast to the process illustrated in FIG. 3, FIG. 4 illustrates process steps that enables a player to preview a game by using a magnetic stripe player tracking card 140 in accordance with an embodiment of the invention. As previously discussed, a magnetic stripe card 140 can only store a small quantity of information such as an identification number. The presence of the back-end server 50 is thus typically required in combination with the application of the magnetic stripe card 140.

Once the magnetic stripe card 140 is entered into the gaming device 20 (step 310) and the identification number is read (step 320), the back-end server 50 is contacted (step 330). If contact cannot be made, the process terminates (step 420). However, if contact is made, the gaming device 20 transmits the identification number to the back-end server 50.

The back-end server 50 maintains a list of identification numbers that are authorized to initiate preview play, as well as all parameters for configuring the appropriate preview play. The back-end server 50 then checks the received identification number against its list (step 340). If the identification number does not match any on the list, preview play is unavailable for that card 140, and the process ends at step 420. If a match is found, preview play is available for the holder of that card 140. The parameters for preview play are then retrieved, and preview play is set up accordingly (step 350). The back-end server 50 then initiates preview play 360 according to these parameters. Again, as above, such parameters are simply the parameters of the game to be played, such as the outcomes or the rewards to be paid.

Once preview play is initiated (step 360), the player may be allowed to participate interactively, or may simply be a passive witness to preview play of the game. Either way, winning outcomes may or may not be achieved (step 370). If a win occurs, the back-end server 50 consults its paytable (which may or may not have been modified according to the appropriate parameters) to determine the appropriate reward (step 380). This reward, if any, is then presented to the player (step 390). As mentioned, the award may be merely an indication of the what the player could have received had they achieved a similar outcome when playing the game outside of preview play.

At various points in the game, such as after an electronically generated hand of cards or an electronic die roll, or after a specified amount of time (stored on the back-end server 50) has elapsed, play may be ended (step 400). If it is not, then the process continues to step 360 and preview play continues. If preview play is to end, preview play information on the back-end server 50 is updated, perhaps to update the amount of preview play time allotted to the holder of the card 140, or to log the awards paid to the holder of the card 140 (step 410), and preview play ends at step 420.

In connection with the process steps of FIG. 4, it should be noted that certain embodiments of the invention allow the back-end server 50 to fully execute game play, with the gaming machine 20 being simply a dummy terminal that displays the game as executed by the server 50. As servers 50 can be configured to run more than one game, it follows that each gaming machine 20 can, in some embodiments, display more than one game. More specifically, even though a gaming machine 20 typically displays a first game, insertion of the tracking card 140 may initiate the display of a preview of a second game. For example, a gaming machine 20 can typically display a video poker game, and may even be advertised as a video poker machine. However, a card 140 may store an identification number corresponding to preview play of a slot game. In embodiments corresponding to FIG. 4, the back-end server 50 may be configured to run both video poker and slot games. Accordingly, upon insertion of the card 140 into the video poker game, preview play of a slot game may could be initiated instead. One of skill will realize that the invention therefore encompasses the initiation of preview play of games that are different from those normally played on a particular gaming machine 20.

One advantage of the invention is that it permits players to preview a previously unfamiliar game by simply inserting their tracking card into a game machine. In this manner, gaming establishments have a convenient platform to offer new games to their customers, and players have an opportunity to sample play of these new games with little or no cost.

FIGS. 5-7 illustrate an example of preview play, so as to further demonstrate novel aspects of the invention. In this example, regular game play of the slot game is explained, and preview play is then shown in contrast. In conventional play of a slot game, players either pull a handle or press a button to commence spin a number of reels. When each reel stops spinning, it displays a number or symbol as an outcome. For example, one spin of a five reel slot machine may produce a Queen—Nine—Ten—Ace—Money Symbol. Desired outcomes, such as Ace—Ace—Ace—Ace—Ace, may produce monetary rewards.

Commonly, slot games store a numerical value associated with each position on each reel. This can be represented by the table of FIG. 5, where for a typical five reel slot game, each symbol 500 is assigned a number 510. Accordingly, typical parameters of such a slot game include a series of randomly or pseudo randomly generated numbers corresponding to numbers 510 that dictate game outcomes, as well as a paytable 520 for determining the reward or payout associated with each outcome. In operation of a five reel slot machine, players initiate play by pulling the slot machine handle or pressing a button. This randomly generates a set 530 of five numbers 510, here shown as 15, 3, 10, 30, and 21, in FIG. 6. Each number 510 is then matched to its corresponding symbol, using the Game Instruction Table of FIG. 5. For instance, the number 15 corresponds to the first reel displaying a "10." As can be seen from the table, the numbers 15, 3, 10, 30, and 21 correspond to the five reels displaying results 540 of, in order, Ten, King, Eight, Queen, and Ten. Consulting the paytable 520, the payout value 550 for the results 540 is two dollars.

In one example of preview play, the paytable 520 is set to small values to provide the player a preview of what he or she could win, without excessive cost to the gaming establishment. The randomly generated results 530 are also replaced with preset values so that the player can witness some of the more favorable outcomes he or she may receive. In accordance with the process steps outlined above, players simply approach a game machine 20 with their player tracking card. Whether the tracking card is a smart card 100 or a simple magnetic stripe card 140, it can be configured to initiate play of a slot game. Parameters of the slot game, which are either stored on the smart card 100 or a back-end server 50, are retrieved and the slot game is configured accordingly. Specifically, the paytable 520 is wiped and its values are replaced with preset nominal values. The preview play paytable 600 is thus populated with much smaller values. One or more sets of predetermined results 610 are also utilized. When the player pulls the slot machine handle or presses the appropriate button, the set of predetermined results 610 is matched to the table of FIG. 5 to determine the resulting symbols 620 seen by the player. In this example, the set of predetermined results 610 consists of 9, 17, 12, 6, and 31, resulting in symbols 620 of Money Symbol—King—Money Symbol—King—King. This obviously favorable outcome results in a nominal payout value of one dollar. Preview play can then continue, with further result sets 610 producing other outcomes.

As can be seen, the parameters retrieved and used in sample play of a slot game include dollar values for paytables 600, and one or more sets of predetermined results. It should be noted that the invention is not limited to use of particular values of these parameters. For example, other dollar values for paytable 600 can be employed. Commonly, zero values can be used if preview play is intended simply to illustrate how the game is played, rather than to present a reward. The invention is also not limited to the parameters shown. Preview play may include randomly generated results rather than predetermined results 610, although predetermined results 610 are often desirable to show users some of the better outcomes and potentially larger jackpots.

In the example of FIG. 7, players are an active participant in preview play, pulling handles or pressing buttons themselves to initiate game play. However, as discussed previously, the invention can also allow players to be passive observers. It should be clear that, once the player inserts his or her tracking card, the preview play of FIG. 7 can be run automatically, with the player simply observing how the game is played.

Likewise, the invention is also not limited to display of the outcomes shown. Rather, any display of outcomes is contemplated. Thus, the parameters need not include preset results. Randomly generated results can be employed to give players a sense of what typical game play entails. Conversely, the results can include sequences of some of the more desirable game outcomes (e.g., several good poker hands, big slot jackpots, and the like), so as to entice the player to play.

The invention is also not limited to the slot game context. Rather, various embodiments of the invention can be used to illustrate preview play of any game capable of being played on a game machine 20, 30. For example, preview play can be of a video poker game or a blackjack game. Similarly, the invention can illustrate many different preview play modes of a single game. For instance, while the preview play of FIG. 7 illustrates a single player slot game, preview play can also be used to highlight link progressive play of multiple networked games. It is known that link progressive play involves multiple players playing games on networked gaming machines 20, 30 that each pay into a single jackpot. Each player then has a chance of winning all or part of this common jackpot, which due to the number of players can be larger than the typical jackpot from a single machine 20. The invention thus encompasses preview play of link progressive games, where the player is shown the current common jackpot value along with a preview of the game. Such previewing of link progressive play may educate players as to the potential rewards of progressive games, thus encouraging them to play.

The foregoing description, for purposes of explanation, used specific nomenclature to provide a thorough understanding of the invention. However, it will be apparent to one skilled in the art that the specific details are not required in order to practice the invention. In other instances, well-known devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, the invention contemplates preview play of any game capable of being played on a game machine, either by smart card or simple magnetic stripe tracking card. The invention also includes multiple modes of preview play, including but not limited to displays of typical game play, predetermined sequences of more favorable outcomes, and progressive play. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A gaming machine system, comprising a wager-based gaming machine and a player tracking card, the wager-based gaming machine being configured to present a first wager based game, the gaming machine including at least a processor, a value input device, a value output device, a random number generator, a cabinet and a display device;

said processor being configured to determine a payout of cash or indicia of credit for play of the preview of the first wager-based game based upon a paytable associated with the first wager-based game;

the random number generator being coupled to the processor and configured to generate random numbers used to determine outcomes for the first wager-based game or a preview of a second wager-based game, the second wager-based game being different from the first wager-based game;

the value input device being configured to receive cash or an indicia of credit for a wager on the first wager-based game;

the value output device being configured to output cash or an indicia of credit as a result of play of the preview of the first wager-based game;

the cabinet being configured to enclose the processor and the random number generator and to secure the display device, the value input device and the value output device; and the player tracking card being configured for communication with the wager-based gaming machine, wherein, responsive to reading one or more preview play parameters stored on the player tracking card, the wager-based gaming machine:

automatically initiates the preview of the second wager-based game;

displays the preview of the second wager-based game for a specified duration of time; and writes information regarding the specified duration of time to the player tracking card to determine whether the preview should terminate.

2. The gaming machine system of claim 1 wherein the preview of the second wager-based game is an interactive session of the second wager-based game.

3. The gaming machine system of claim 1 wherein play of the second wager-based game is governed by the one or more preview play parameters, and wherein the preview includes play of the second wager-based game according to preset values of the one or more preview play parameters.

4. The gaming machine system of claim 3 wherein the player tracking card further stores the preset values of the one or more preview play parameters, and wherein the wager-based gaming machine is further configured to display the preview of the second wager-based game according to the preset values.

5. The gaming machine system of claim 3 further comprising a back-end computer in electronic communication with the gaming machine and configured to store the preset values of the one or more preview play parameters, wherein the wager-based gaming machine is further configured to receive the preset values from the back-end computer and display the preview of the second wager-based game according to the preset values.

6. The gaming machine system of claim 3 wherein the second wager-based game is a slot game, and wherein the preset values include a predetermined payout value preventing the wager-based gaming machine from awarding money that exceeds the predetermined payout value.

7. The gaming machine system of claim 6 wherein the predetermined payout value is zero.

8. The gaming machine system of claim 3 wherein the second wager-based game has a plurality of possible outcomes, and wherein the preset values include predetermined ones of the plurality of possible outcomes to use in the preview of the second wager-based game.

9. The gaming machine system of claim 1 wherein the second wager-based game is configured to be played in a first mode having a first paytable with first payout probability values, and a second mode having a second paytable with second payout probability values greater than corresponding ones of the first payout probability values, and wherein the preview includes a display of the second mode.

10. The gaming machine system of claim 1 wherein the second wager-based game is configured to be played in a progressive mode capable of awarding a jackpot having money from multiple players, and wherein the preview includes a display of the progressive mode.

11. The gaming machine system of claim 1 the player tracking card comprises the memory.

12. The gaming machine system of claim 1 wherein the memory comprises a back-end computer in electronic communication with the wager-based gaming machine.

13. A player tracking card for use with a wager-based gaming machine configured to present a first wager based game, the tracking card comprising:

a memory storing information identifying a user and time information defining a period of time during which the wager-based gaming machine is to display a preview of a second wager-based game, the second wager-based game being different from the first wager-based game; and a microprocessor in electronic communication with the memory, and configured to instruct the gaming machine to initiate, automatically, the preview of the second wager-based game on the gaming machine continuously for the period of time responsive to communication being established between the microprocessor and the gaming machine, and wherein the preview of the second wager-based game is an interactive session of the second wager-based game configured to be played by the user.

14. The tracking card of claim 13 wherein play of the second wager-based game is governed by one or more parameters, and wherein the memory stores preset values of the one or more parameters, and wherein the preview includes play of the second wager-based game according to the preset values.

15. The tracking card of claim 14 wherein the second wager-based game is a slot game, and wherein the preset values include a predetermined payout value preventing the wager-based gaming machine from paying money to the user that exceeds the predetermined payout value.

16. The tracking card of claim 15 wherein the predetermined payout value is zero.

17. The tracking card of claim 14 wherein the second wager-based game has a plurality of possible outcomes, and wherein the preset values include predetermined ones of the plurality of possible outcomes to use in the preview of the second wager-based game.

18. The tracking card of claim 13 wherein the second wager-based game is configured to be played in a first mode having a first paytable with first payout probability values, and a second mode having a second paytable with second payout probability values greater than corresponding ones of the first payout probability values, and wherein the preview includes a display of the second mode.

19. The tracking card of claim 13 wherein the second wager-based game is configured to be played in a progressive mode capable of awarding a jackpot having money from multiple players, and wherein the preview includes a display of the progressive mode.

20. A method of previewing a second wager-based game on a wager-based gaming machine configured to present a first wager-based game and a preview of the second wager-based game, the second wager-based game being different from the first wager-based game, the method comprising:

receiving, from a player tracking card, information related to a user of the wager-based gaming machine;

receiving time information defining a specified duration of time during which the preview of the second wager-based game is to be displayed;

initiating the preview of the second wager-based game including an interactive session of the second wager-based game that is configured to be played by the user;

determining a paytable that is associated with the preview of the second wager-based game;

determining one or more outcomes to the preview of the second wager-based game;

determining a payout of cash or an indicia of credit associated with the preview of the second wager-based game based upon the paytable and upon said one or more determined outcomes wherein said wager-based gaming machine is configured to output the cash or the indicia of credit.

21. The method of claim 20 wherein the initiating further comprises receiving values of one or more parameters governing play of the second wager-based game, and wherein the initiating further comprises initiating the preview of the second wager-based game according to the values of the one or more parameters.

22. The method of claim 21 wherein the receiving values of one or more parameters further includes receiving the values from the tracking card.

23. The method of claim 21 wherein the receiving values of one or more parameters further includes receiving the values from a back-end computer in electronic communication with the gaming machine.

24. The method of claim 21 wherein the receiving values of one or more parameters further includes receiving a predetermined payout value of a slot game, and paying money to the user that does not exceed the predetermined payout value.

25. The method of claim 21 wherein the receiving values of one or more parameters further includes receiving a predetermined payout value equal to zero.

26. The method of claim 21 wherein the second wager-based game has a plurality of possible outcomes and wherein the receiving values of one or more parameters further includes receiving ones of the plurality of the possible outcomes to use during the preview of the second wager-based game.

27. The method of claim 20 wherein the wager-based gaming machine is configured to generate the preview of the second wager-based game in a first mode having a first paytable with first payout probability values, and a second mode having a second paytable with second payout probability values greater than corresponding ones of the first payout probability values, the initiating further includes initiating the preview of the second wager-based game, the preview including a display of the second mode of the second wager-based game.

28. The method of claim 20 wherein the wager-based gaming machine is configured to display a game configured to be played in a progressive mode capable of awarding a jackpot having money from wagers made by multiple players, the initiating further includes initiating the preview of the second wager-based game, the preview including a display of the progressive mode of the second wager-based game.

29. A gaming machine system, comprising:

a wager-based gaming machine configured to present a first wager-based game, the gaming machine including at least a processor, a value input device, a value output device, a random number generator, and a display device;

said processor being configured to determine a payout of cash or indicia of credit for play of the preview of the first wager-based game based upon a paytable associated with the first wager-based game;

the random number generator, coupled to the processor, configured to generate random numbers used to determine outcomes for the first wager-based game or a preview of a second wager-based game, the second wager-based game being different from the first wager-based game;

the value input device configured to receive cash or an indicia of credit for a wager on the first wager-based game;

the value output device configured to output cash or an indicia of credit as a result of play of the preview of the first wager-based game;

a cabinet configured to enclose the processor and the random number generator and to secure the display device, the value input device and the value output device; and a player tracking card configured for communication with the wager-based gaming machine, wherein, responsive to reading one or more preview play parameters stored on the player tracking card, the wager-based gaming machine automatically initiates the preview of the second wager-based game, and displays the preview of the second wager-based game for a continuous limited duration of time and writes information regarding the continuous limited duration of time to one of the player tracking card or a remote gaming device in communication with the wager-based gaming machine.

30. A gaming machine system, comprising:

a wager-based gaming machine configured to present a first wager-based game, the gaming machine including at least a processor, a value input device, a value output device, a random number generator, and a display device;

said processor being configured to determine a payout of cash or indicia of credit for play of the preview of the first wager-based game based upon a paytable associated with the first wager-based game;

the random number generator, coupled to the processor, configured to generate random numbers used to determine outcomes for the first wager-based game or a preview of a second wager-based game, the second wager-based game being different from the first wager-based game;

the value input device configured to receive cash or an indicia of credit for a wager on the first wager-based game;

the value output device configured to output the cash or the indicia of credit as a result of play of the preview of the wager-based game;

a cabinet configured to enclose the processor and the random number generator and to secure the display device, the value input device and the value output device; and a player tracking card configured for communication with the wager-based gaming machine, wherein, responsive to reading one or more preview play parameters stored on the player tracking card the wager-based gaming machine automatically initiates the preview of the second wager-based game, and wherein the wager-based gaming machine is configured to display the preview of the second wager-based game for a limited number of times and writes information regarding said limited number of times to one of the player tracking card or a remote gaming device in communication with the wager-based gaming machine.

31. A gaming machine system, comprising:

a wager-based gaming machine configured to present a first wager-based game, the gaming machine including at least a processor, a value input device, a value output device, a random number generator, and a display device;

said processor being configured to determine a payout of cash or indicia of credit for play of the preview of the first wager-based game based upon a paytable associated with the first wager-based game;

the random number generator, coupled to the processor, configured to generate random numbers used to determine outcomes for the first wager-based game or a preview of a second wager-based game, the second wager-based game being different from the first wager-based game;

the value input device configured to receive cash or an indicia of credit for a wager on the first wager-based game;

the value output device configured to output the cash or the indicia of credit as a result of play of the preview of the wager-based game;

a cabinet configured to enclose the processor and the random number generator and to secure the display device, the value input device and the value output device; and a player tracking card that is carried by a user of the wager-based gaming machine and that is configured for communication with the wager-based gaming machine, wherein, responsive to reading one or more preview play parameters stored on the player tracking card the wager-based gaming machine automatically initiates the preview of the second wager-based game, and wherein the wager-based gaming machine displays the preview of the second wager-based game for a specified duration of time and writes information regarding the specified duration of time to a memory in communication with the wager-based gaming machine to determine whether the preview should terminate and wherein the gaming machine is configured to display a first wager-based game and a preview of a second game, the second wager-based game being different from the first wager-based game.

32. A gaming machine system, comprising:

a wager-based gaming machine configured to present a first wager-based game, the gaming machine including at least a processor, a value input device, a value output device, a random number generator, and a display device;

said processor being configured to determine a payout of cash or indicia of credit for play of the preview of the first wager-based game based upon a paytable associated with the first wager-based game;

the random number generator, coupled to the processor, configured to generate random numbers used to determine outcomes for the first wager-based game or a preview of a second wager-based game, the second wager-based game being different from the first wager-based game;

the value input device configured to receive cash or an indicia of credit for a wager on the first wager-based game;

the value output device configured to output the cash or the indicia of credit as a result of play of the preview of the wager-based game;

a cabinet configured to enclose the processor and the random number generator and to secure the display device, the value input device and the value output device; and a player tracking card that is carried by a user of the wager-based gaming machine and that is configured for communication with the wager-based gaming machine, wherein responsive to reading one or more preview play parameters stored on the player tracking card the wager-based gaming machine automatically initiates the preview of the second wager-based game, and wherein the wager-based gaming machine displays the preview of the second wager-based game for a specified duration of time and writes information regarding the specified duration of time to a memory in communication with the wager-based gaming machine to determine whether the preview should terminate and wherein play of the wager-based game is governed by the one or more preview play parameters, and wherein the preview includes play of the wager-based game according to preset values of the one or more preview play parameters.

33. A gaming machine system, comprising:

a wager-based gaming machine configured to present a first wager-based game, the gaming machine including at least a processor, a value input device, a value output device, a random number generator, and a display device;

said processor being configured to determine a payout of cash or indicia of credit for play of the preview of the first wager-based game based upon a paytable associated with the first wager-based game;

the random number generator, coupled to the processor, configured to generate random numbers used to determine outcomes for the first wager-based game or a preview of a second wager-based game, the second wager-based game being different from the first wager-based game;

the value input device configured to receive cash or an indicia of credit for a wager on the first wager-based game;

the value output device configured to output the cash or the indicia of credit as a result of play of the preview of the wager-based game;

a cabinet configured to enclose the processor and the random number generator and to secure the display device, the value input device and the value output device; and a portable sample play device configured for communication with the wager-based gaming machine, wherein responsive to reading one or more preview play parameters stored on the player tracking card the wager-based gaming machine automatically initiates the preview of the second wager-based game, and wherein the wager-based gaming machine displays the preview of the second wager-based game for a specified duration of time and writes information regarding the specified duration of time to a memory in communication with the wager-based gaming machine to determine whether the preview should terminate and wherein the wager-based game is configured to be played in a first mode having a first paytable with first payout probability values, and a second mode having a second paytable with second payout probability values greater than corresponding ones of the first payout probability values, and wherein the preview includes a display of the second mode.

34. A gaming machine system, comprising:

a wager-based gaming machine configured to present a first wager-based game, the gaming machine including at least a processor, a value input device, a value output device, a random number generator, and a display device;

said processor being configured to determine a payout of cash or indicia of credit for play of the preview of the first wager-based game based upon a paytable associated with the first wager-based game;

the random number generator, coupled to the processor, configured to generate random numbers used to determine outcomes for the first wager-based game or a preview of a second wager-based game, the second wager-based game being different from the first wager-based game;

the value input device configured to receive cash or an indicia of credit for a wager on the first wager-based game;

the value output device configured to output the cash or the indicia of credit as a result of play of the preview of the wager-based game;

a cabinet configured to enclose the processor and the random number generator and to secure the display device, the value input device and the value output device; and player tracking card configured for communication with the wager-based gaming machine, wherein, responsive to reading one or more preview play parameters stored on the player tracking card the wager-based gaming machine automatically initiates the preview of the second wager-based game, and wherein the wager-based gaming machine displays the preview of the second wager-based game for a specified duration of time and writes information regarding the specified duration of time to a memory in communication with the wager-based gaming machine to determine whether the preview should terminate and wherein the wager-based game is configured to be played in a progressive mode capable of awarding a jackpot having money from multiple players, and wherein the preview includes a display of the progressive mode.

35. A gaming machine system, comprising:

a wager-based gaming machine configured to present a first wager-based game, the gaming machine including at least a processor, a value input device, a value output device, a random number generator, and a display device;

said processor being configured to determine a payout of cash or indicia of credit for play of the preview of the first wager-based game based upon a paytable associated with the first wager-based game;

the random number generator, coupled to the processor, configured to generate random numbers used to determine outcomes for the first wager-based game or a preview of a second wager-based game, the second wager-based game being different from the first wager-based game;

the value input device configured to receive cash or an indicia of credit for a wager on the wager-based game;

the value output device configured to output the cash or the indicia of credit as a result of play of the preview of the wager-based game;

a cabinet configured to enclose the processor and the random number generator and to secure the display device, the value input device and the value output device; and a player tracking card configured for communication with the wager-based gaming machine, wherein, responsive to reading one or more preview play parameters stored on the player tracking card the wager-based gaming machine automatically initiates the preview of the second wager-based game and displays the preview of the second wager-based game for a specified duration of time and writes information regarding said defined period of time to the player tracking card.

36. A gaming machine system, comprising:

a wager-based gaming machine configured to present a first wager-based game, the gaming machine including at least a processor, a value input device, a value output device, a random number generator, and a display device;

said processor being configured to determine a payout of cash or indicia of credit for play of the preview of the first wager-based game based upon a paytable associated with the first wager-based game;

the random number generator, coupled to the processor, configured to generate random numbers used to determine outcomes for the first wager-based game or a preview of a second wager-based game, the second wager-based game being different from the first wager-based game;

the value input device configured to receive cash or an indicia of credit for wagers on the first wager-based game;

the value output device configured to output the cash or the indicia of credit as a result of play of the preview of the wager-based game;

a cabinet configured to enclose the processor and the random number generator and to secure the display device, the value input device and the value output device; and a player tracking card configured for communication with the wager-based gaming machine, wherein, responsive to reading one or more preview play parameters stored on the player tracking card the wager-based gaming machine automatically initiates the preview of the second wager-based game and displays the preview of the second wager-based game for a specified duration of time and writes information regarding said specified duration of time to a back-end computer in communication with the wager-based gaming machine.

37. A player tracking card for use with a wager-based gaming machine configured to present a first wager based game, the tracking card comprising:

a memory storing information identifying a user and time information defining a period of time during which an associated wager-based gaming machine is to display a preview of a second wager-based game, the second wager-based game being different from the first wager-based game; and a microprocessor in electronic communication with the memory, and configured to instruct the gaming machine to initiate, automatically, the preview of the second wager-based game on the gaming machine continuously for the period of time responsive to communication being established between the microprocessor and the gaming machine.

38. A player tracking card for use with a wager-based gaming machine configured to present a first wager based game, the tracking card comprising:

a memory storing information identifying a user and time information defining a period of time during which an associated wager-based gaming machine is to display a preview of a second wager-based game, the second wager-based game being different from the first wager-based game; and a microprocessor in electronic communication with the memory, and configured to instruct the gaming machine to initiate, automatically, the preview of the second wager-based game on the gaming machine continuously for the period of time responsive to communication being established between the microprocessor and the gaming machine, wherein play of the second wager-based game is governed by one or more parameters, wherein the memory stores preset values of the one or more parameters, and wherein the preview includes play of the second wager-based game according to the preset values.

39. A player tracking card for use with a wager-based gaming machine configured to present a first wager based game, the tracking card comprising:

a memory storing information identifying a user and time information defining a period of time during which the wager-based gaming machine is to display a preview of a second wager-based game, the second wager-based game being different from the first wager-based game; and a microprocessor in electronic communication with the memory, and configured to instruct the wager-based gaming machine to initiate, automatically, the preview of the second wager-based game on the gaming machine continuously for the period of time responsive to communication being established between the microprocessor and the gaming machine, wherein the second wager-based game is configured, responsive to reading the information in the memory, to be played in a first mode having a first paytable with first payout probability values, and a second mode having a second paytable with second payout probability values greater than corresponding ones of the first payout probability values, and wherein the preview includes a display of the second mode.

40. A player tracking card for use with a wager-based gaming machine configured to present a first wager based game, the tracking card comprising:

a memory storing information identifying a user and time information defining a period of time during which the wager-based gaming machine is to display a preview of a second wager-based game, the second wager-based game being different from the first wager-based game; and a microprocessor in electronic communication with the memory, and configured to instruct the wager-based gaming machine to initiate, automatically, the preview of the second wager-based game on the gaming machine continuously for the period of time responsive to communication being established between the microprocessor and the gaming machine, wherein the second wager-based game is configured, responsive to reading the information in the memory, to be played in a progressive mode capable of awarding a jackpot having money from multiple players, and wherein the preview includes a display of the progressive mode.

41. A method of previewing a second wager-based game on a wager-based gaming machine configured to present a first wager-based game and a preview of the second wager-based game, the second wager-based game being different from the first wager-based game, the method comprising:

receiving, from a player tracking card, information related to a user of the wager-based gaming machine, receiving from one of the tracking card and a remote device first information defining an amount of time that is allocated to showing the preview of the second wager-based game;

initiating the preview of the second wager-based game automatically in response to receiving the first information and showing the preview of the second wager-based game continuously for the amount of time;

determining a paytable that is associated with the preview of the second wager-based game;

determining one or more outcomes to the preview of the second wager-based game;

determining a payout of cash or an indicia of credit associated with the preview of the second wager-based game based upon the paytable and said one or more determined outcomes wherein said wager-based gaming machine is configured to output the cash or the indicia of credit.

42. A method of previewing a second wager-based game on a wager-based gaming machine configured to present a first wager-based game and a preview of the second wager-based game, the second wager-based game being different from the first wager-based game, the method comprising:

receiving, from a player tracking card, information related to a user of the wager-based gaming machine, receiving from one of the tracking card and a remote device first information defining a number of times that the preview of the second wager-based game is allowed to be displayed;

initiating the preview of the second wager-based game automatically in response to receiving the first information and displaying the preview continuously for a period of time if the number of times has not been exceeded;

determining a paytable that is associated with the preview of the second wager-based game;

determining one or more outcomes to the preview of the second wager-based game;

determining a payout of cash or an indicia of credit associated with the preview of the second wager-based game based upon the paytable and said one or more determined outcomes wherein said wager-based gaming machine is configured to output the cash or the indicia of credit.

43. A method of previewing a second wager-based game on a wager-based gaming machine configured to present a first wager based game and a second wager-based game, and previews of said wager-based games, the second wager-based game being different from the first wager-based game, the method comprising:

receiving, from a player tracking card, information related to a user of the wager-based gaming machine, receiving time information defining a period of time during which a preview of a wager-based game is to be displayed;

initiating a preview of the first wager-based game automatically in response to receiving the time information initiating a preview of the second wager-based game;

determining a first paytable that is associated with the preview of the first wager-based game;

determining a second paytable that is associated with the preview of the second wager-based game;

determining one or more first outcomes to the preview of the first wager-based game;

determining one or more second outcomes to the preview of the second wager-based game; and displaying the preview of the first wager-based game continuously for the period of time;

displaying the preview of the second wager-based game continuously for the period of time;

determining a payout of cash or an indicia of credit associated with the preview of the first wager-based game based upon the first paytable and said one or more determined first outcomes and associated with the preview of the second wager-based game based upon the second paytable and said one or more determined second outcomes wherein said wager-based gaming machine is configured to output the cash or the indicia of credit.

44. A method of previewing a second wager-based game on a wager-based gaming machine configured to present a first wager-based game and a preview of the second wager-based game, the second wager-based game being different from the first wager-based game, the method comprising:

receiving, from a player tracking card, information related to a user of the wager-based gaming machine, receiving time information defining a period of time during which the preview of the second wager-based game is to be displayed;

initiating, automatically in response to receiving the time information, the preview of the second wager-based game, said initiating comprising receiving values of one or more parameters governing play of the second wager-based game and presenting the preview of the second wager-based game on the wager-based gaming machine according to the values of the one or more parameters;

determining a paytable that is associated with the preview of the second wager-based game;

determining one or more outcomes to the preview of the second wager-based game; and determining a payout of cash or an indicia of credit associated with the preview of the second wager-based game based upon the paytable and said one or more determined outcomes wherein said wager-based gaming machine is configured to output the cash or the indicia of credit.

45. A method of previewing a second wager-based game on a wager-based gaming machine configured to present a first wager-based game and a preview of the second wager-based game, the second wager-based game being different from the first wager-based game, the method comprising:

receiving, from a player tracking card, information related to a user of the wager-based gaming machine, receiving time information defining a period of time during which the preview of the second wager-based game is to be displayed;

initiating, automatically in response to receiving the time information, the preview of the second wager-based game wherein the wager-based gaming machine is configured to generate the preview of the second wager-based game in a first mode having a first paytable with first payout probability values, and a second mode having a second paytable with second payout probability values greater than corresponding ones of the first payout probability values, wherein the initiating the preview of the second wager-based game includes a display of the second mode of the wager-based game determining one or more outcomes to the preview of the second wager-based game; and determining a payout of cash or an indicia of credit associated with the preview of the second wager-based game based upon the second paytable and said one or more determined outcomes wherein said wager-based gaming machine is configured to output the cash or the indicia of credit.

46. A method of previewing a second wager-based game on a wager-based gaming machine configured to present a first wager-based game and a preview of the second wager-based game, the second wager-based game being different from the first wager-based game, the method comprising:

receiving, from a player tracking card, information related to a user of the wager-based gaming machine, receiving time information defining a period of time during which the preview of the second wager-based game is to be displayed;

wherein the wager-based gaming machine is configured to display a progressive mode capable of awarding a jackpot having money from wagers made by multiple players, initiating, automatically in response to receiving the time information, the preview of the second wager-based game including a display of the progressive mode determining a paytable that is associated with the preview of the second wager-based game;

determining one or more outcomes to the preview of the second wager-based game; and determining a payout of cash or an indicia of credit associated with the preview of the second wager-based game based upon the paytable and said one or more determined outcomes wherein said wager-based gaming machine is configured to output the cash or the indicia of credit.

47. The method of claim 20 wherein the time information is received from the tracking card.

* * * * *